(12) United States Patent
Petersson et al.

(10) Patent No.: US 10,446,925 B2
(45) Date of Patent: Oct. 15, 2019

(54) METHOD FOR BEAMFORMING A BEAM USING AN ACTIVE ANTENNA

(71) Applicant: Telefonaktiebolaget LM Ericsson (publ), Stockholm (SE)

(72) Inventors: Sven Petersson, Sävedalen (SE); Björn Johannisson, Kungsbacka (SE); Martin Johansson, Mölndal (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 292 days.

(21) Appl. No.: 15/536,887

(22) PCT Filed: Dec. 23, 2014

(86) PCT No.: PCT/EP2014/079202
§ 371 (c)(1),
(2) Date: Jun. 16, 2017

(87) PCT Pub. No.: WO2016/102010
PCT Pub. Date: Jun. 30, 2016

(65) Prior Publication Data
US 2017/0352953 A1    Dec. 7, 2017

(51) Int. Cl.
*H01Q 3/24* (2006.01)
*H01Q 3/26* (2006.01)
(Continued)

(52) U.S. Cl.
CPC .......... *H01Q 3/247* (2013.01); *H01Q 3/2605* (2013.01); *H01Q 21/22* (2013.01); *H01Q 21/26* (2013.01); *H04B 7/0617* (2013.01); *H04B 7/10* (2013.01)

(58) Field of Classification Search
CPC ...... H01Q 3/247; H01Q 3/2605; H01Q 21/22; H04B 7/0617; H04B 7/10
(Continued)

(56) References Cited

U.S. PATENT DOCUMENTS 5,532,706 A * 7/1996 Reinhardt .......... H01Q 13/0258
                                                       333/21 A
2005/0068249 A1 * 3/2005 Frederick du Toit .......................
                                                       H01Q 3/242
                                                       343/876
2007/0241978 A1   10/2007 Cheng

FOREIGN PATENT DOCUMENTS

| WO | 2006071153 A1 | 7/2006 |
| WO | 2011050866 A1 | 5/2011 |
| WO | 2011095184 A1 | 8/2011 |

OTHER PUBLICATIONS

International Search Report and Written Opinion dated Sep. 7, 2015 in International Application No. PCT/EP2014/079202, 12 pages.

* cited by examiner

*Primary Examiner* — Harry K Liu
(74) *Attorney, Agent, or Firm* — Rothwell, Figg, Ernst & Manbeck, P.C.

(57) ABSTRACT

The present invention relates to a method for beamforming a beam using an active antenna having predetermined aperture data predetermined aperture data comprising M×N dual polarized antenna subarrays within an aperture, each dual polarized antenna subarray comprising a first antenna subarray having a first polarization and a second antenna subarray having a second polarization non-parallel with the first polarization. The method comprises: selecting number of antenna ports, each antenna port being adapted to generate a separate beam using a combination from the first antenna subarray and/or the second antenna subarray; selecting port properties, comprising target beamwidth for each separate beam and desired polarization between beams; and determining port partitioning based upon aperture data and port properties for each antenna port, to adjust an effective length of the aperture over which the beam is created and
(Continued)

thereby defining which first antenna subarray(s) and/or second antenna subarray(s) to use for each antenna port.

26 Claims, 8 Drawing Sheets

(51) Int. Cl.
*H01Q 21/22* (2006.01)
*H01Q 21/26* (2006.01)
*H04B 7/06* (2006.01)
*H04B 7/10* (2017.01)

(58) Field of Classification Search
USPC .......................................................... 342/350
See application file for complete search history.

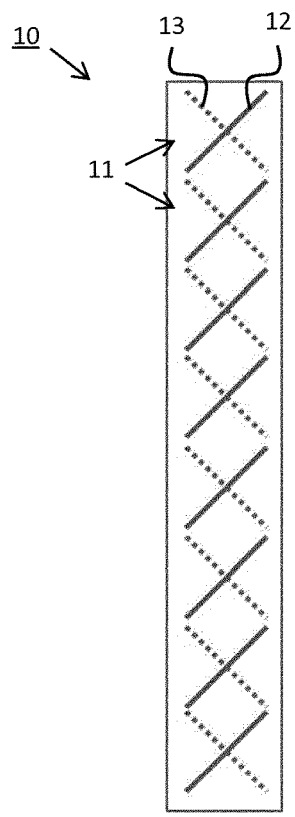
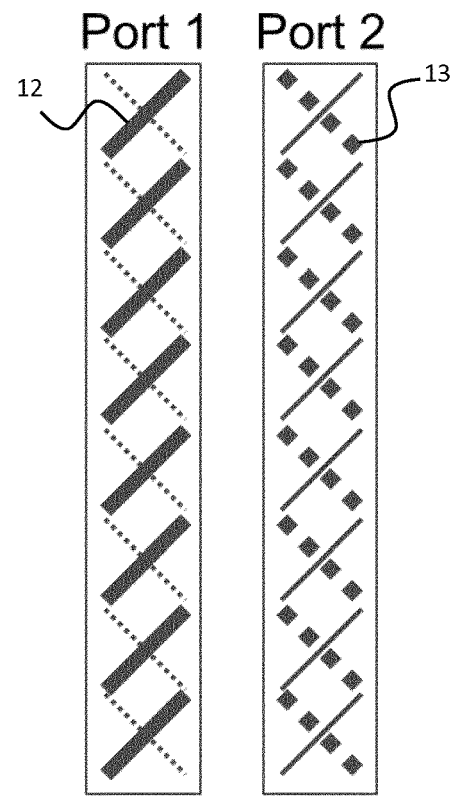
Fig. 1a (Prior Art)  Fig. 1b (Prior Art)
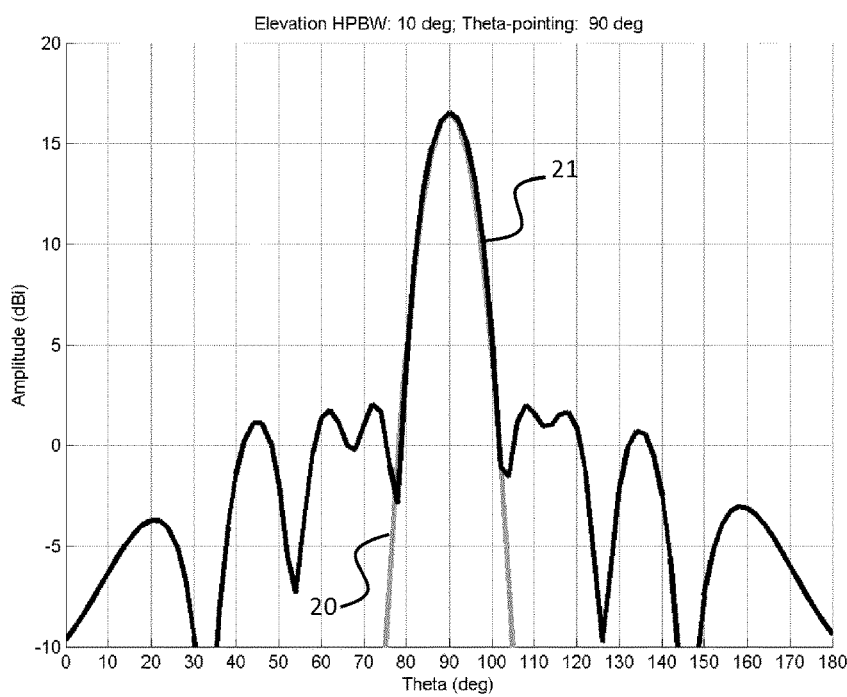
Fig. 2 (Prior Art)

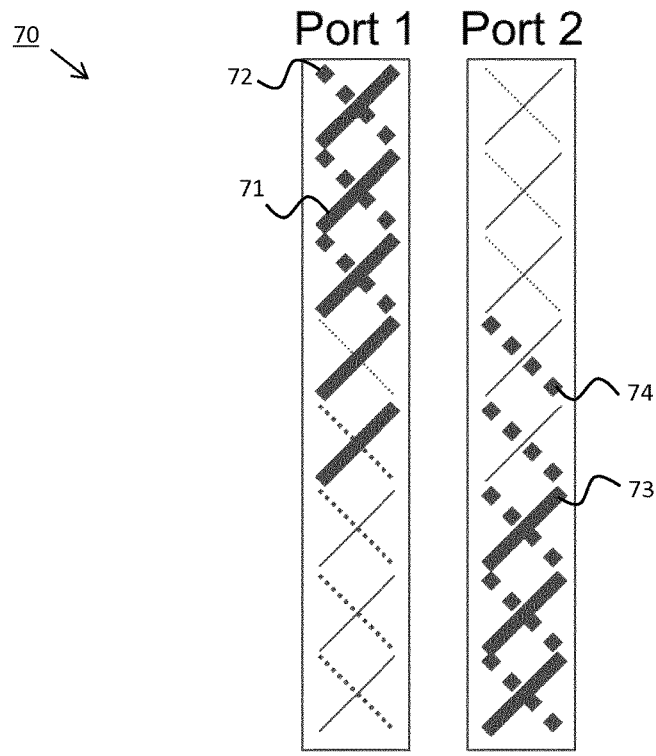
Fig. 7
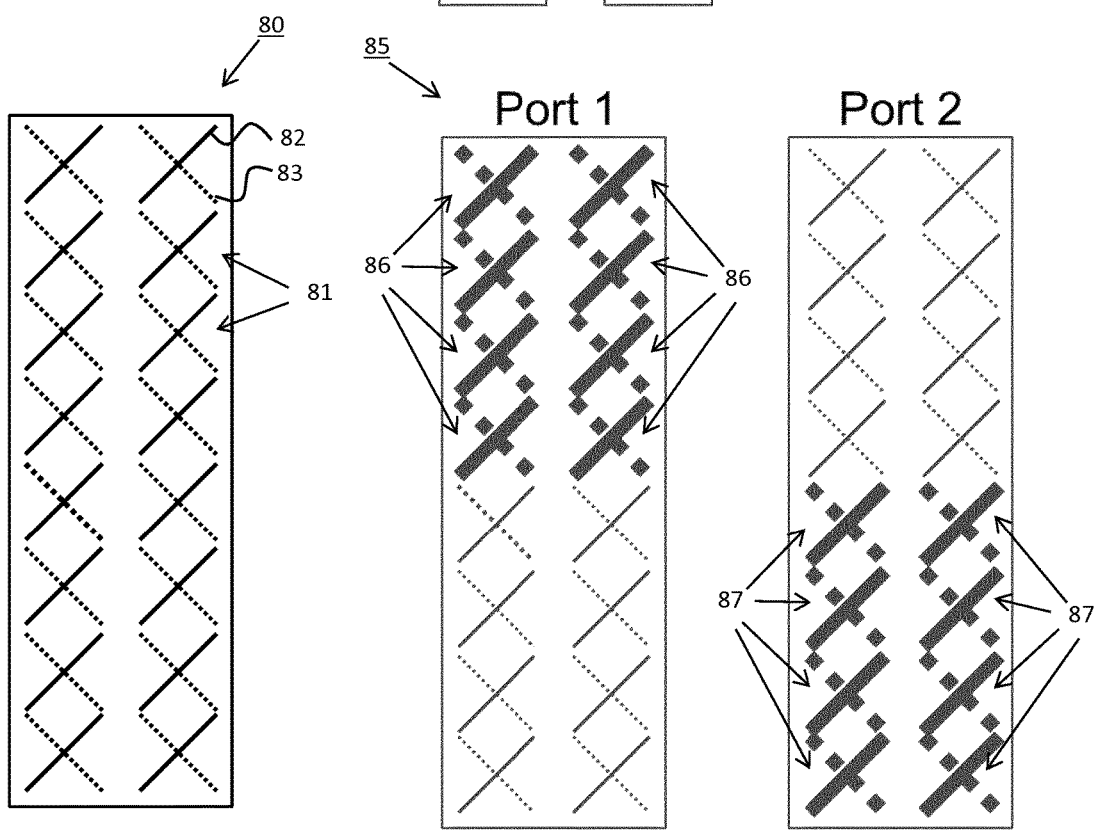
Fig. 8a
Fig. 8b

METHOD FOR BEAMFORMING A BEAM USING AN ACTIVE ANTENNA

CROSS-REFERENCE TO RELATED APPLICATION(S)

This application is a 35 U.S.C. § 371 National Stage of International Patent Application No. PCT/EP2014/079202, filed Dec. 23, 2014, designating the United States, the disclosure of which is incorporated by reference.

TECHNICAL FIELD

The disclosure relates to a method for beamforming a beam as defined in the preamble of the independent claim 1. The invention also relates to an antenna system.

BACKGROUND

The market for active antennas with distributed radio chains in mobile telephony systems is very immature with only a small number of commercial products. Most active antenna arrays till now are related to testbeds.

One of the properties an active antenna array is desired to have is flexibility to adjust port characteristics based on needs. One example of flexibility is the ability to adjust beamwidths within a wide angular interval and of course to steer the beam in different directions. It is also desired to use the available power resource in an efficient manner.

Creating beams with beamwidths (in radians) approximately equal to one over the linear size of an antenna in wavelengths is known for a skilled person in the art using phase taper only and conventional beamforming, i.e. acting on one single polarization, as illustrated in connection with FIGS. 1 and 2. However, in many cases, creating wider beams are very difficult and sometimes even impossible with this conventional technique, using the power resource efficiently, as illustrated in connection with FIG. 3.

SUMMARY

One object with the present invention is to obviate at least some of the above disadvantages and provide an improved method for beamforming a beam compared to prior art techniques.

The object may be achieved with a method for beamforming a beam using an active antenna having predetermined aperture data comprising M×N dual polarized antenna subarrays within an aperture. Each dual polarized antenna subarray comprises a first antenna subarray, having a first polarization, and a second antenna subarray, having a second polarization non-parallel with the first polarization. The method comprises: selecting number of antenna ports, wherein each antenna port being adapted to generate a separate beam using a combination of multiple antenna subarrays from the first antenna subarray and/or the second antenna subarray; selecting port properties, comprising target beamwidth for each separate beam and desired polarization between beams; and determining port partitioning based upon aperture data and port properties for each antenna port, to adjust an effective length of the aperture over which the beam is created and thereby defining first antenna subarray(s) and/or second antenna subarray(s) connected to each antenna port.

The object may also be achieved by an antenna system configured to transmit at least two beams. The antenna system comprising: an active antenna; an amplification arrangement; and a control unit. The active antenna has predetermined aperture data comprising M×N dual polarized antenna subarrays within an aperture. Each dual polarized antenna subarray comprises a first antenna subarray having a first polarization and a second antenna subarray having a second polarization, non-parallel with the first polarization. The amplification arrangement is configured to be connected to each first and second antenna subarray and each antenna port is adapted to generate a separate beam and to be connected to, via said amplification arrangement, a combination of multiple antenna subarrays from said first antenna subarray and/or said second antenna subarray. The control unit is adapted to: select a number of antenna ports; select port properties, comprising target beamwidth for each separate beam and desired polarization between beams; and determine port partitioning based upon aperture data and port properties for each antenna port, to adjust an effective length of the aperture over which the beam is created, and thereby define first antenna subarray(s) and/or second antenna subarray(s) connected to each antenna port.

An advantage with the present invention is that a wide range of beam shapes can be generated with beamwidths covering a large angular interval not achievable with conventional beamforming.

Further objects and advantages will be apparent for a skilled person from the detailed description and the drawings.

BRIEF DESCRIPTION OF THE DRAWINGS

FIG. 1a shows a one-dimensional antenna array.

FIG. 1b illustrates port partitioning in a one-dimensional antenna array with single polarized beamforming according to prior art.

FIG. 2 shows the beam pattern using the port partitioning illustrated in FIG. 1 with target half-power beamwidth equal to 10 degrees.

FIG. 7 illustrates a second embodiment of the invention for port partitioning in a one-dimensional antenna array with dual polarization beamforming.

FIG. 8a shows a two-dimensional antenna array.

FIG. 8b illustrates a first embodiment of the invention for port partitioning in a two-dimensional antenna array with dual polarization beamforming.

DETAILED DESCRIPTION

Figure 3:
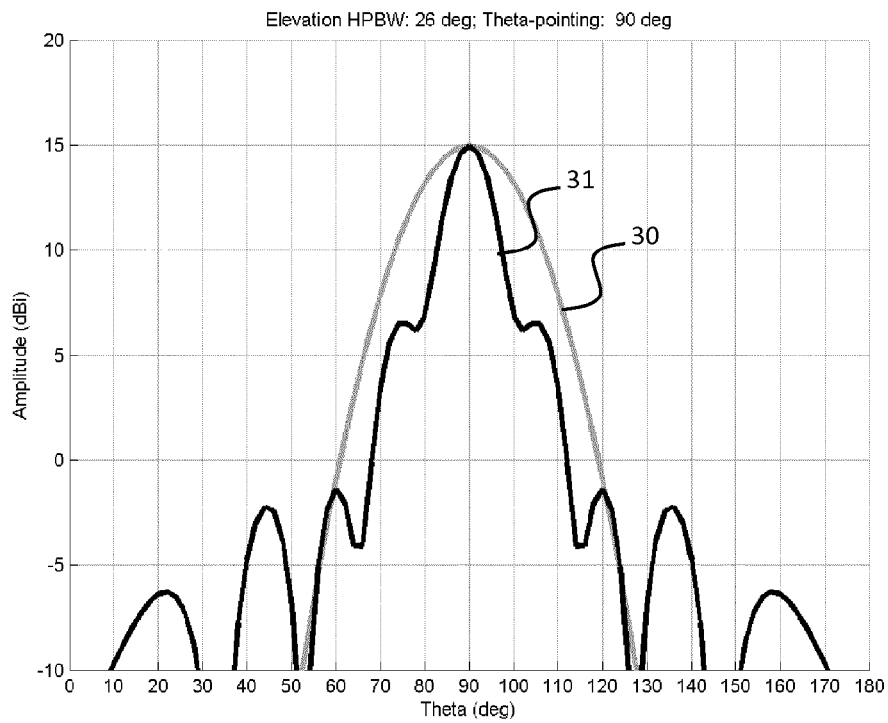
FIG. 3 shows the beam pattern using the port partitioning illustrated in FIG. 1 with target half-power beamwidth equal to 26 degrees.

FIG. 1a shows a one-dimensional antenna array 10 having an antenna aperture with 1×8 dual polarized subarrays 11 used for single polarized beamforming according to prior art. FIG. 1b illustrates a first embodiment 15 of port partitioning in the one-dimensional antenna array 10 using the dual polarized subarrays to generate port mappings for two ports, Port 1 and Port 2. The antenna ports of a two-port antenna normally have common properties with the same power pattern and orthogonal polarization in any direction.

It is desired to use the output power resource in an efficient manner, which in this context means all elements in a port partitioning vector to have, at least close to, the same magnitude. Another way to describe this is that only phase taper is applied in the port partitioning.

Furthermore, each dual polarized antenna subarray 11 comprises a first antenna subarray 12 that have a first polarization and a second antenna subarray 13 that have a second polarization non-parallel with the first polarization, e.g. polarization parallelity less than 0.5, or perpendicular, to each other. Each antenna subarray 11 may be realized as one antenna element or a group of individual antenna elements connected by a feed network (not shown), and may be connected to a single antenna port to avoid problems associated with resource sharing.

Issues regarding how much power that can be used by each antenna port and how beamforming over antenna ports sharing resources should be accomplished may arise if each antenna subarray is connected to more than one antenna port. When correlated signals are input to multiple ports sharing the same power amplifier resource, the typical result is an uneven load of the power amplifiers due to coherent addition of signals, which should be avoided.

Prior art beamforming technique is to apply a signal to antenna subarrays 11 (here illustrated by a single antenna element) with the same polarization, i.e., by means of Single Polarization BeamForming (SPBF). This technique works fine as long as the target beamwidth in radians is roughly corresponding to one over the size of the aperture. The partitioning of the aperture for this type of port mapping is shown in FIG. 1b and an example of a corresponding beam pattern is shown in FIG. 2. The target Half-Power Beam-Width (HPBW) is 10 degrees with a corresponding beam shape for a main beam 20 and a resulting beam pattern 21, showing good performance.

The port partitioning is suitable for narrow beams, as illustrated in connection with FIGS. 11 and 13. The antenna subarrays used by an antenna port are indicated by bold lines, i.e. first antenna subarrays 12 in solid lines for Port 1 and second antenna subarrays 13 in dashed lines for Port 2.

For wider beamwidths it is very difficult, or even impossible, to design a port mapping with SPBF, see example of such an attempt in FIG. 3 using only phase tapering to provide good utilization of power resources. The target HPBW is 26 degrees with a corresponding beam shape for a main beam 30 and a resulting beam pattern 31, showing poor performance.

Figure 4:
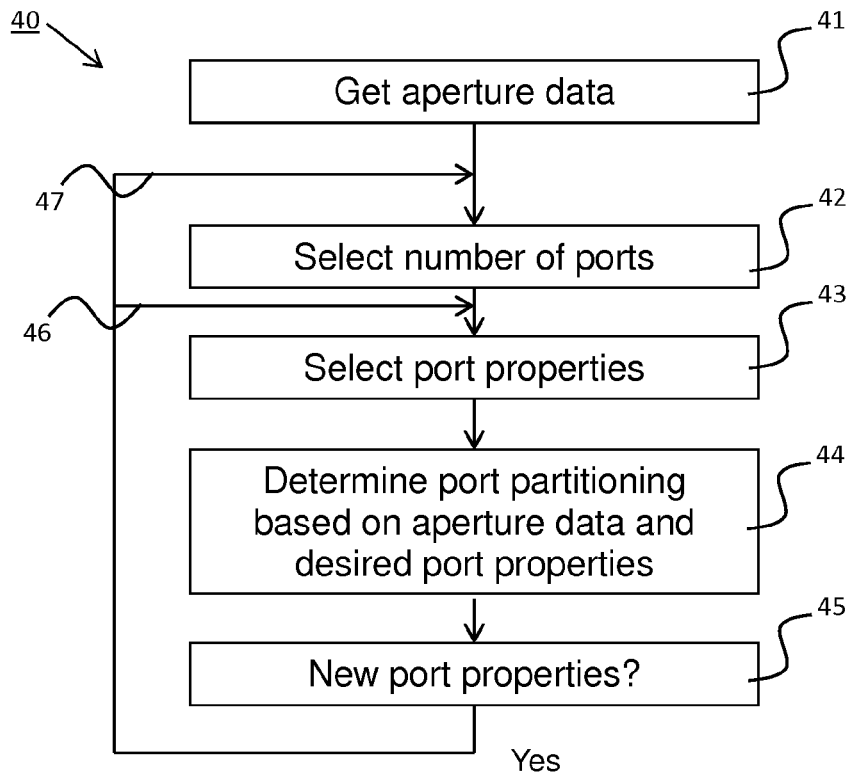
FIG. 4 shows a flow chart embodying a method of the invention.

FIG. 4 illustrates a high level flowchart describing the invention, how to use the antenna aperture.

The beamwidth of the resulting pattern can be varied, e.g. increased by shorten the effective length of the aperture over which the beam is created while still maintaining good power resource utilization. This can be done by applying dual polarization beamforming (DPBF) which means that the beam is actually given as the power sum of two beams with different, e.g. orthogonal, polarizations.

FIG. 4 illustrates a method 40 for beamforming a beam using an active antenna. Initially, the process starts with getting the aperture data 41, which is a predetermined configuration of the antenna subarrays in an aperture comprising M×N dual polarized antenna subarrays within the aperture. The number of antenna subarrays M and N in each dimension is defined in order to perform port partitioning.

As mentioned in connection with FIGS. 1 and 2, each dual polarized antenna subarray 11 comprising a first antenna subarray 12 having a first polarization and a second antenna subarray 13 having a second polarization non-parallel with, i.e. different from, the first polarization.

In 42, the number of antenna ports is selected. Each antenna port is adapted to be connected to a combination of multiple antenna subarrays from the first antenna subarray 12 and/or the second antenna subarray 13.

This means that an antenna port can be connected to multiple antenna subarrays having the same polarization and apply SPBF, or be connected to at least one antenna subarray having the first polarization and at least one antenna subarray having a second, non-parallel, polarization and apply DPBF.

In 43, antenna port properties in the form of target beamwidth ($BW_{target}$) for each separate beam and desired polarization between beams are selected. An antenna port is not typically designed to have a certain polarization, but the polarization for a given port is designed in relation to another antenna port. The desired polarization may include the same as (parallel) or orthogonal to the polarization of another port, for each antenna port.

In order to create a beam with desired port properties, i.e. target beamwidth and polarization, a method to obtain this need to be selected. The choice is either to apply SPBF or DPBF. In 44, port partitioning is determined based upon aperture data and port properties for each antenna port, to adjust an effective length of the aperture over which the beam is created and thereby defining first antenna subarray(s) and/or second antenna subarray(s) connected to each antenna port.

Optionally, the method also comprises a step 45 in which instructions are received to change the port properties for example by manual tuning of a radio network or automated analysis in a RAS-SON system. When instructions are received in 45 to change port properties, adaptive beamforming is achieved by repeating steps 43 and 44 (indicated by arrow 46), or alternatively repeating steps 42, 43 and 44 (as indicated by arrow 47) in case the antenna system is adapted to change the number of selected antenna ports.

The process of determining port partitioning in 44 can be performed by generating port partitioning parameters for a first port and then generate port partitioning parameters for a second port based upon the port partitioning parameters of the first port.

The equations given below are valid for a dual polarized ULA with the dual polarized elements numbered from one end of the antenna to the other. The equations look different for UPA (planar arrays). To fulfill the design target that both antenna ports have the same power pattern the parameters for the second port are directly related to the parameters for the first port. Given the parameters for the first port, the first port partitioning matrix Pi is defined as:

$$p_1 = \begin{bmatrix} p_{1A} \\ p_{1B} \end{bmatrix}$$

wherein $p_{1A}$ is a port partitioning vector applied to the first polarization and $p_{1B}$ is a port partitioning vector applied to the second polarization, in this example orthogonal to the first polarization, and a second port partitioning matrix is generated by:

$$p_2 = \begin{bmatrix} Fp_{1B}^* \\ -Fp_{1A}^* \end{bmatrix}$$

wherein F is a matrix that reverses the order of the elements in the vector and $p_{1A}^*$ is complex conjugate of $p_{1A}$ and $p_{1B}^*$ is complex conjugate of $p_{1B}$.

Figure 5:
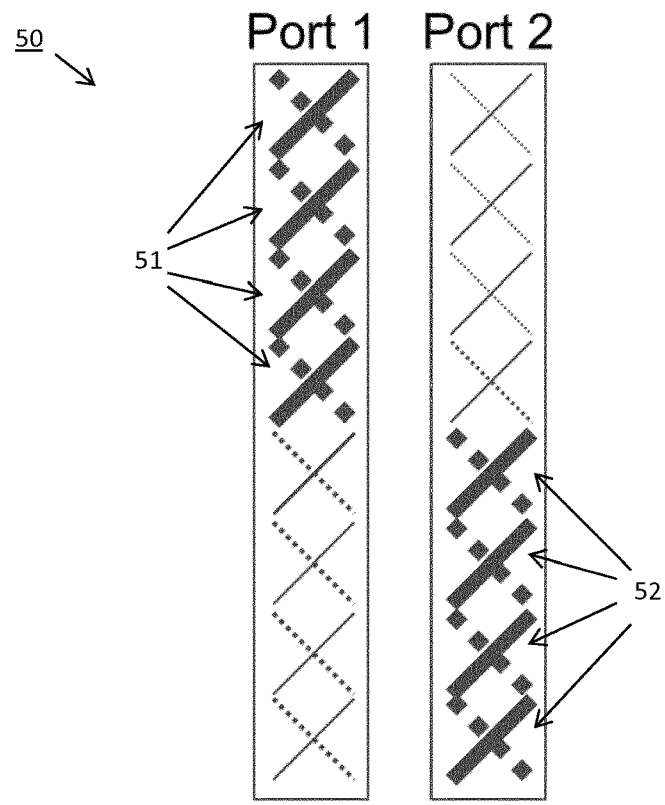
FIG. 5 illustrates a first embodiment of the invention for port partitioning in a one-dimensional antenna array with dual polarization beamforming.
Figure 6:
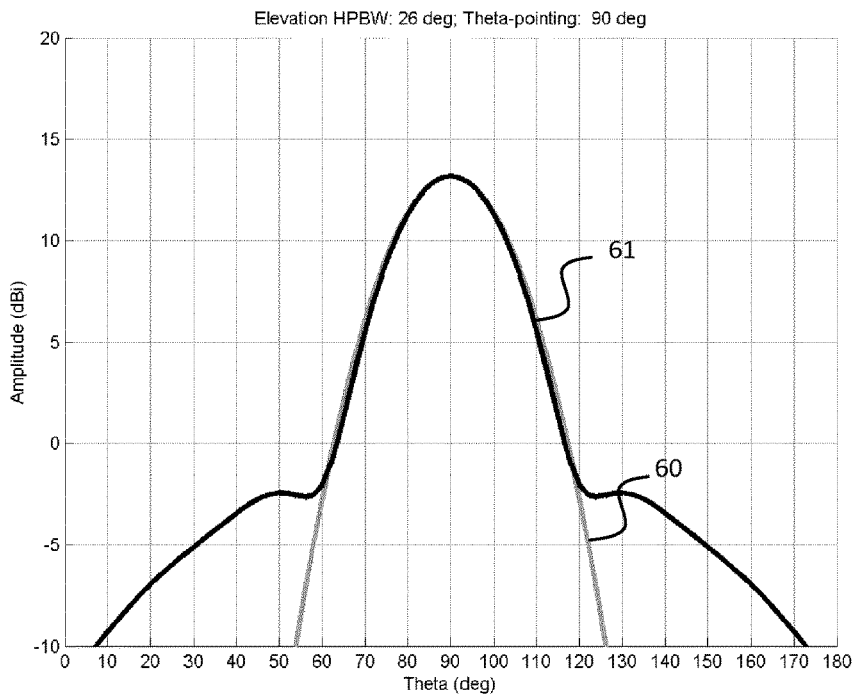
FIG. 6 shows the beam pattern using the port partitioning illustrated in FIG. 5 with target half-power beamwidth equal to 26 degrees.

FIG. 5 illustrates a first embodiment 50 for port partitioning in a one-dimensional antenna array, as shown in FIG. 1a, with dual polarization beamforming. The partitioning of the aperture for this type of port mapping is illustrated and an example of a corresponding beam pattern is shown in FIG. 6. The target HPBW is 26 degrees with a corresponding beam shape for a main beam 60 and a resulting beam pattern 61, showing good performance. The port partitioning is suitable for wide beams, as illustrated in connection with FIGS. 12 and 13. The antenna subarrays used by an antenna port are indicated by bold lines, i.e. the top four dual polarized antenna subarrays 51 (comprising first antenna subarrays and second antenna subarrays as shown in connection with FIG. 1a) for Port 1 and the lower dual polarized antenna subarrays 52 (comprising first antenna subarrays and second antenna subarrays) for Port 2.

However, the narrowest beam that can be created given this partitioning, i.e. dividing the array into two equal sized arrays, one for each antenna port, is twice the narrowest beamwidth possible with configuration according to FIG. 1, which means that there appears to be a wide gap in beamwidth between the two different partitioning methods.

To allow for beamwidths in between the ones available from the two partitioning examples, FIG. 1 and FIG. 5, it is possible to configure another partitioning for DPBF where the number of subarrays used per polarization differs from each other. One example of such partitioning is shown in FIG. 7 for a single column antenna.

FIG. 7 illustrates a second embodiment 70 for port partitioning in a one-dimensional antenna array with dual polarization beamforming. In this example, five antenna subarrays having a first polarization, indicated by bold solid lines 71, and three antenna subarrays having a second polarization, indicated by bold dashed lines 72 are connected to port 1 to obtain a target HPBW of approximately 19 degrees (derivable from FIG. 12) with a desired beam shape with a target HPBW. In order to obtain a corresponding orthogonal beam from port 2, five antenna subarrays having the first polarization, indicated by bold lines 73, and five antenna subarrays having a second polarization, indicated by bold dashed lines 74, are connected to Port 2 and the complex parameters applied to each subarrays is properly selected from the parameters used for port 1.

The same principles as described above can be applied also for other number of ports than two, for example four. However, in such case all ports will not have orthogonal polarization in any direction. Typically port mapping for this case is designed such that pairs of ports will have identical polarization.

The same principles can be applied also for apertures of size M×N. An example of this is shown in FIG. 8a showing an antenna array 80 having aperture size 2×8 with eight dual polarized antenna subarrays 81 arranged in two columns. Each dual polarized antenna subarray 81 having first antenna subarrays 82 and second antenna subarrays 83 with similar properties as described in connection with FIG. 1b.

FIG. 8b illustrates a first embodiment 85 for port partitioning in a two-dimensional antenna array with dual polarization beamforming. The shown port partitioning is suitable for wide beams, similarly to the port partitioning for the one-dimensional antenna arrays described in connection with FIGS. 5 and 6. The antenna subarrays used by an antenna port are indicated by bold lines, i.e. the top four dual polarized antenna subarrays 86 in both columns for Port 1 and the lower dual polarized antenna subarrays 87 in both columns for Port 2.

Figure 9:
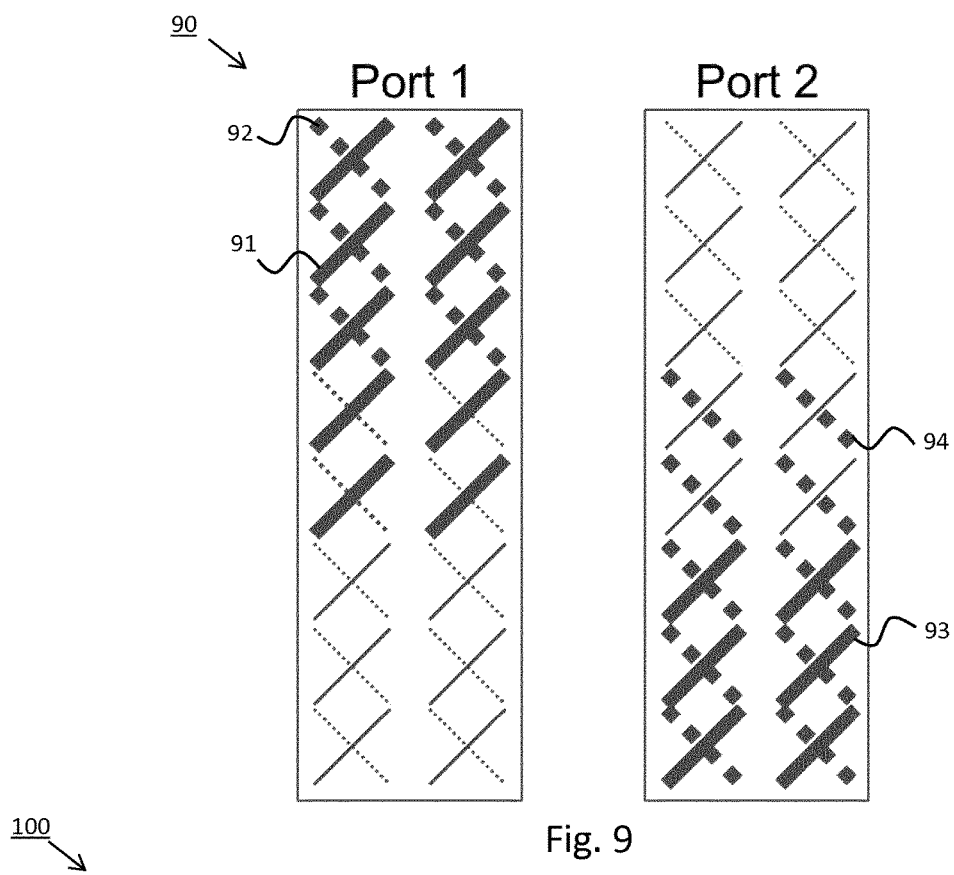
FIG. 9 illustrates a second embodiment of the invention for port partitioning in a two-dimensional antenna array with dual polarization beamforming.

FIG. 9 illustrates a second embodiment 90 for port partitioning in the two-dimensional antenna array, as shown in FIG. 8a, with dual polarization beamforming, wherein the number of antenna subarrays with different polarization connected to an antenna port differ. In this example, five antenna subarrays having a first polarization, indicated by bold solid lines 91, and three antenna subarrays having a second polarization, indicated by bold dashed lines 92, in the top part of each column are connected to port 1 to obtain a target HPBW with a corresponding beam shape for a main beam. In order to obtain a corresponding orthogonal beam from port 2, five antenna subarrays having the first polarization, indicated by bold lines 93, and five antenna subarrays having a second polarization, indicated by bold dashed lines 94, in the lower part of each column are connected to Port 2.

Figure 10:
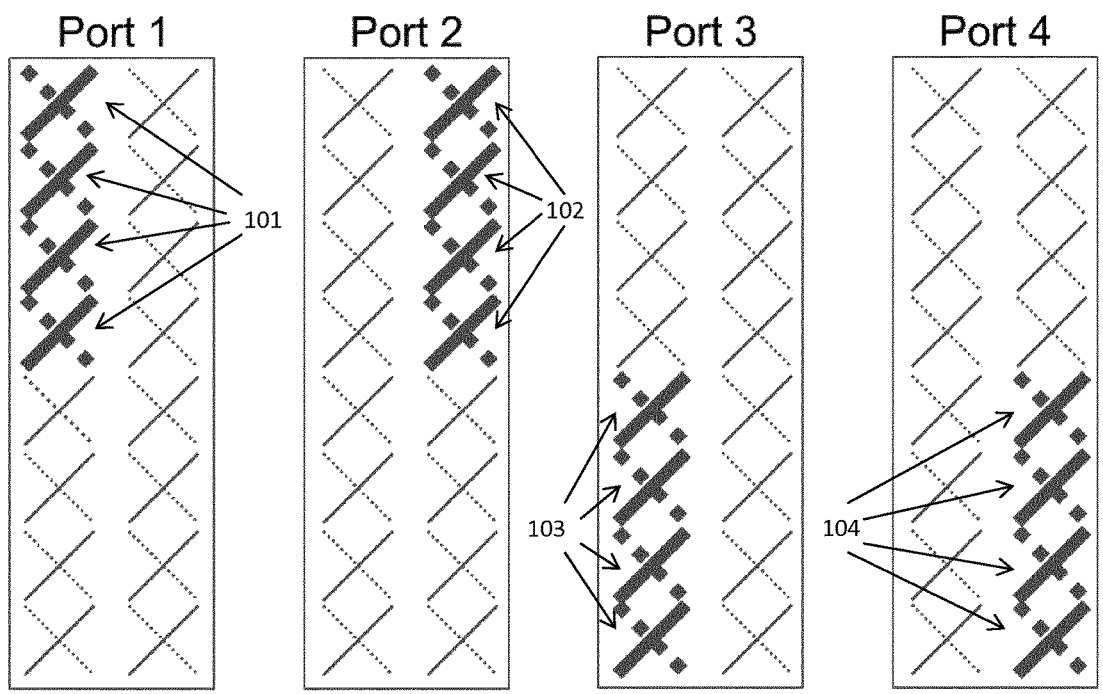
FIG. 10 illustrates a third embodiment of the invention for port partitioning in a two-dimensional antenna array with dual polarization beamforming.

FIG. 10 illustrates a third embodiment 100 for port partitioning in the two-dimensional antenna array, as shown in FIG. 8a, with dual polarization beamforming using four ports, Port 1, Port 2, Port 3 and Port 4. In this example, the target HPBW is 26 degrees with a corresponding beam shape for a main beam and a resulting beam pattern as illustrated in FIG. 6 and being suitable for wide beams. The antenna subarrays used by an antenna port are indicated by bold lines, i.e. the top four dual polarized antenna subarrays 101 in a first column are connected to Port 1, the top four dual polarized antenna subarrays 102 in the second column are connected to Port 2, the lower dual polarized antenna subarrays 103 in the first column are connected to Port 3, and the lower dual polarized antenna subarrays 104 in the second column are connected to Port 4.

Separate beams are generated by the antenna subarrays connected to each antenna port. Two ports normally generate beams having a first polarization, and the remaining ports generate beams having a second polarization orthogonal to the first polarization. For example, Port 1 and 2 may be configured to create separate beams with the first polarization, and Port 3 and 4 may be configured to create separate beams with the second polarization, or Port 1 and 3 may be configured to create separate beams with the first polarization, and Port 2 and 4 may be configured to create separate beams with the second polarization depending on azimuth or elevation separation of the beams having the same polarization.

It is of course possible to generalize the invention to include an arbitrary number of ports.

As illustrated above, the method of the invention involves adaptation of how antenna subarrays with different polarization are connected to each antenna port. This can further be exemplified using a generic one-dimensional antenna array with N dual polarized antenna subarrays arranged in a column or row, i.e. 1×N dual polarized antenna subarrays, using SPBF for narrow beams and DPBF for wide beams.

As an example, the decision mechanism to select the beamforming technique SPBF or DPBF and configuration can be implemented using a beamforming index ($BF_{index}$), defined as (N−n)/N, which is indicative of the port partitioning. The number n is calculated by dividing a reference beamwidth ($BW_{reference}$) with the target beamwidth and multiplying with the total number of subarrays N, and the reference beamwidth is obtained by feeding all N dual polarized subarrays in the active antenna with unit amplitude and zero phase. The port partitioning is thereafter based upon the calculated beamforming index.

Using the one-dimensional antenna having 1×N dual polarized antenna subarrays within the aperture as the active antenna, a first port partitioning matrix comprises "n" first antenna subarrays and "N−n" second antenna subarrays. SPBF means that an antenna port is connected up to N subarrays of the first polarization, i.e. n=N, and 0 subarrays of the second polarization. This usage is here denoted as N/0. For best performance, i.e., for any target beamwidth, there shall be a smooth transition from N/0 usage to (N/2)/(N/2) usage, the latter meaning that an antenna port feeds the same number of subarrays per polarization. One example of such usage is n/(N−n) where an antenna port is connected to n subarrays of a first polarization and N−n subarrays of the orthogonal polarization. The number n to use if approximately given by the equation:

$$n = \frac{BW_{reference}}{BW_{desired}} N$$

For small values of (N−n)/N, in the order of <0.3, performance actually gets better if the (N−n) subarrays are not used, i.e. are feed by no, or almost no, signal. The loss in EIRP of not using these subarrays is less than 1 dB whereas the gain in sidelobe level may be up to several dB. For values of (N−n)/N, ranging from 0.3 to 0.5 (i.e. (N/2)/(N/2), whether or not to feed the (N−n) subarrays depends on the actual values of $BW_{reference}$ and $BW_{target}$.

If beamforming index is in the order less than 0.3 ($BF_{index} \leq 0.3$) then single polarization beamforming (SPBF) is selected using "n" first antenna subarrays. This is illustrated in connection with FIGS. 11 and 13.

EXAMPLE 1

An antenna with 8 dual polarized subarrays, here with only 1 dual polarized element per subarray. $BW_{reference}$ (HPBW)=11 degrees when feeding all antenna subarrays with unit amplitude and zero phase.

Target beamwidth is 13 degrees HPBW, which means:

$$n = \frac{11}{13} * 8 \approx 6.77 = > BF_{index} = \frac{N-n}{N} = \frac{8-6.77}{8} \approx 0.15 < 0.3$$

Figure 11:
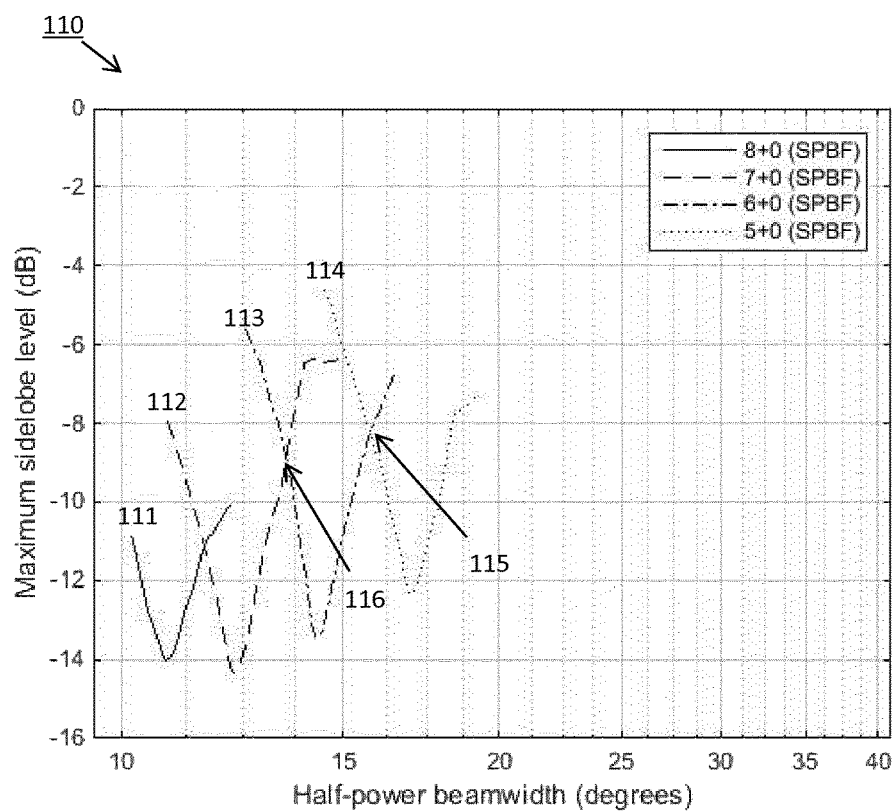
FIG. 11 shows a graph illustrating half-power beamwidth for different port partitioning using single polarization beamforming.

Therefore SPBF is selected with n=7, indicated by 7+0 (SPBF) in FIG. 11.

If beamforming index is ranging from 0.3-0.5 (0.3< $BF_{index}$<0.5) then single polarization beamforming using "n" first antenna subarrays or dual polarization beamforming using "n" first antenna subarrays and "N−n" second antenna subarrays is selected based upon which configuration gives as low sidelobes as possible

EXAMPLE 2

An antenna with 8 dual polarized subarrays, here with only 1 dual polarized element per subarray. $BW_{reference}$ (HPBW)=11 degrees.

Target beamwidth is 18 degrees HPBW, which means that for a one-dimensional antenna with 8 dual polarized antenna subarrays:

$$n = \frac{11}{18} * 8 \approx 4.89 = > BF_{index} = \frac{N-n}{N} = \frac{8-4.89}{8} \approx 0.39 > 0.3 \text{ and } < 0.5$$

Figure 12:
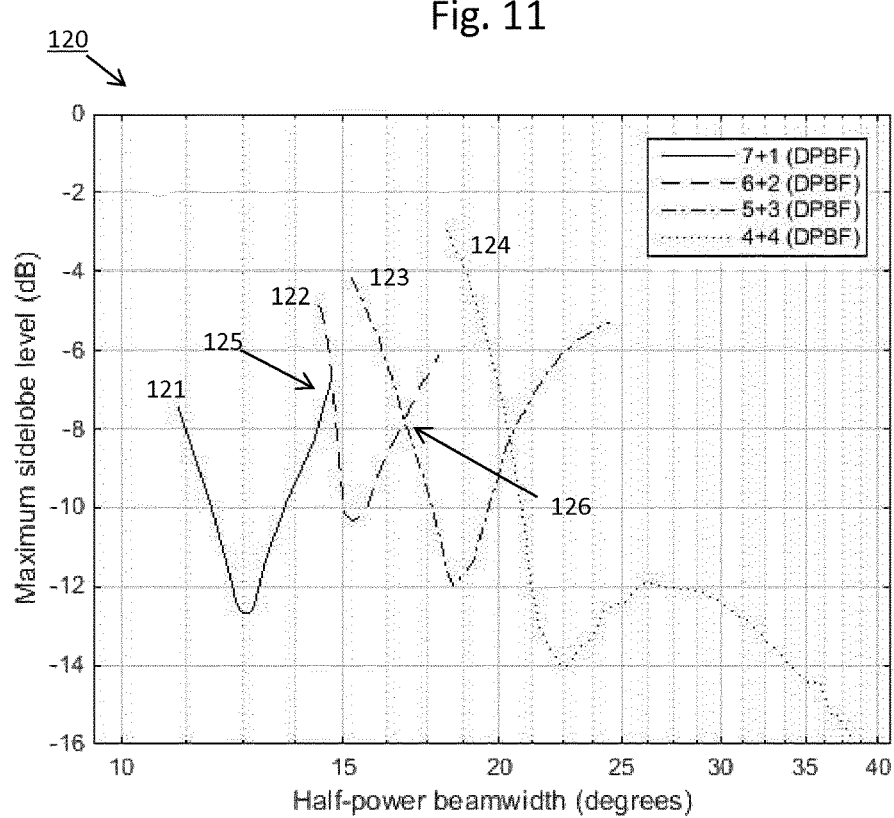
FIG. 12 shows a graph illustrating half-power beamwidth for different port partitioning using dual polarization beamforming.

SPBF using n+0, i.e. 5+0, subarrays will result in a maximum sidelobe level of approximately −10 dB (FIG. 11), and DPBF using n+(N−n), i.e. 5+3, subarrays will result in a maximum sidelobe level of −11 dB (FIG. 12). Therefore, DPBF with 5+3 antenna subarrays is selected to be used.

EXAMPLE 3

An antenna with 8 dual polarized subarrays, here with only 1 dual polarized element per subarray. $BW_{reference}$ (HPBW)=11 degrees.

Target beamwidth is 17 degrees HPBW, which means that for a one-dimensional antenna with 8 dual polarized antenna subarrays:

$$n = \frac{11}{17} * 8 \approx 5.18 = > BF_{index} = \frac{N-n}{N} = \frac{8-5.18}{8} \approx 0.35 > 0.3 \text{ and } < 0.5$$

SPBF using n+0, i.e. 5+0, subarrays will result in a maximum sidelobe level of approximately −12 dB (FIG. 11), and DPBF using n+(N−n), i.e. 5+3, subarrays will result in a maximum sidelobe level of −9 dB (FIG. 12). Therefore, SPBF with 5+0 antenna subarrays is selected to be used.

If beamforming index is in the order of, or larger than, 0.5 ($BF_{index} \geq 0.5$) then dual polarization beamforming using equal number of first antenna subarrays and second antenna subarrays is selected.

EXAMPLE 4

An antenna with 8 dual polarized subarrays, here with only 1 dual polarized element per subarray. $BW_{reference}$ (HPBW)=11 degrees.

Target beamwidth is 21 degrees HPBW, which means that for a one-dimensional antenna with 8 dual polarized antenna subarrays:

$$n = \frac{11}{21} * 8 \approx 4.19 = > BF_{index} = \frac{N-n}{N} = \frac{8-4.19}{8} \approx 0.48 > 0.3 \text{ and } \approx 0.5$$

DPBF is selected since it is in the order of 0.5 and using n+(N−n), i.e. 4+4, subarrays will result in a maximum sidelobe level of −12 dB (FIG. 12).

Figure 13:
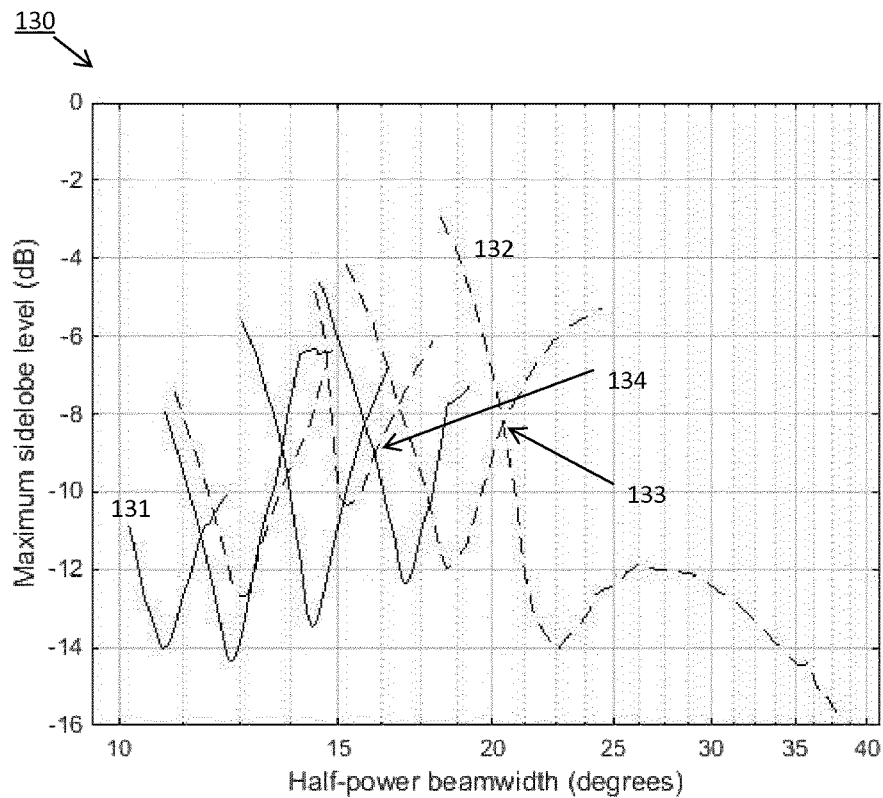
FIG. 13 shows a graph illustrating half-power beamwidth for the port partitioning in FIGS. 11 and 12.

FIGS. 11-13 show how different beamwidths may be obtained in a one-dimensional active antenna.

FIG. 11 shows a graph 110 illustrating half-power beamwidth for different port partitioning using single polarization beamforming for an antenna with 8 subarrays, each subarray consisting of a single dual polarized element.

The solid line 111 indicates the lowest achievable, maximum sidelobe level for SPBF using 8 antenna subarrays with the same polarization, legend 8+0 (SPBF). Furthermore the dashed line 112 indicates SPBF using 7 antenna subarrays with the same polarization, legend 7+0 (SPBF), whereby one antenna subarray is not used. The dash-dotted line 113 indicates SPBF using 6 antenna subarrays with the same polarization, legend 6+0 (SPBF), whereby two antenna subarrays are not used, and the dotted line 114 indicates SPBF using 5 antenna subarrays with the same polarization, legend 5+0 (SPBF), whereby three antenna subarrays are not used. Different maximum sidelobes levels can be identified from 10 degrees HPBW to almost 20 degrees HPBW and the maximum sidelobe levels are −8 dB for approximately 16 degrees HPBW (indicated by 115), and −9 dB for approximately 14 degrees (indicated by 116).

FIG. 12 shows a graph 120 illustrating half-power beamwidth for different port partitioning, for the same antenna as in FIG. 11, using dual polarization beamforming using dual polarized antenna subarrays having first and second polarization as described above. The solid line 121 indicates maximum sidelobe level for DPBF using 7 antenna subarrays with the first polarization and one antenna subarray with the second polarization, legend 7+1 (DPBF). Furthermore the dashed line 122 indicates DPBF using 6 antenna subarrays with the first polarization and 2 antenna subarrays with the second polarization, legend 6+2 (DPBF). The dash-dotted line 123 indicates DPBF using 5 antenna subarrays with the first polarization and 3 antenna subarrays with the second polarization, legend 5+3 (DPBF), and the dotted line 124 indicates DPBF using 4 antenna subarrays with the first polarization and 4 antenna subarrays with the second polarization, legend 4+4 (DPBF). Different maximum sidelobes levels can be identified from 12 degrees HPBW and above, and the maximum sidelobe levels are −7 dB for approximately 15 degrees HPBW (indicated by 125), and −8 dB for approximately 16 degrees (indicated by 126).

FIG. 13 shows a graph 130 illustrating half-power beamwidth for the port partitioning in FIGS. 11 and 12. The HPBW for the SPBF combinations are indicated by the solid lines 131, and the HPBW for the DPBF combinations are indicated by dashed lines 132. As is obvious from the graph, the best sidelobe levels are found either for SPBF or DPBF depending on the target HPBW, and the maximum sidelobe level is approximately −8 dB for 20 degrees HPBW (indicated by 133), and −9 dB for approximately 16 degrees HPBW (indicated by 134).

FIG. 13 illustrates the gradual transformation from "pure" SPBF at low beamwidths (in this example: HPBW is 10-13 degrees) to DPBF using the same number of antenna subarrays per polarization at large beamwidths (in this example: HPBW is more than 20 degrees) for a one-dimensional antenna array.

Figure 14:
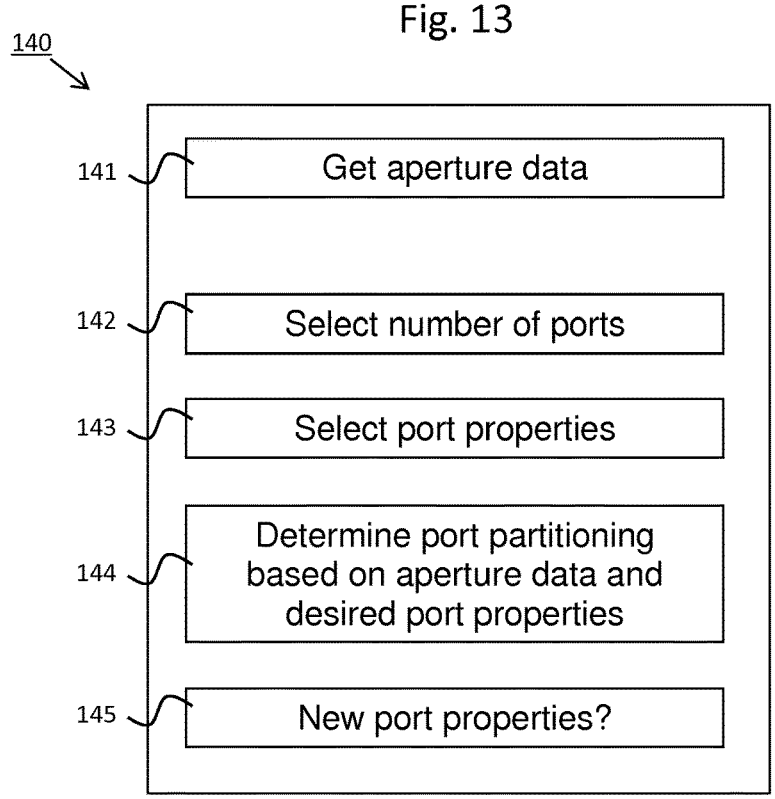
FIG. 14 shows a generic apparatus of the invention.

FIG. 14 shows a generic apparatus 140 adapted to perform beamforming a beam using an active antenna having predetermined aperture data comprising M×N dual polarized antenna subarrays within an aperture, each dual polarized antenna subarray comprising a first antenna subarray having a first polarization and a second antenna subarray having a second polarization non-parallel with the first polarization. The generic apparatus 140 comprises:

a first module 141 adapted to get the aperture data.

a second module 142 to select a number of antenna ports, each antenna port is adapted to be connected to a combination of antenna subarrays from the first antenna subarray and/or the second antenna subarray, a third module 143 to select port properties, comprising target beamwidth ($BW_{target}$) for each beam and desired polarization between beams, a fourth module 144 to determine port partitioning based upon aperture data and port properties for each antenna port, to adjust an effective length of the aperture over which the beam is created and thereby define first antenna subarray(s) and/or second antenna subarray(s) connected to each antenna port, and an optional fifth module 145 to receive instructions to change port properties, and when such instructions are received repeat the functions in the third and fourth module, or alternatively repeat the functions in the second, third and fourth module) in case the antenna system is adapted to change the number of selected antenna ports to achieve adaptive beamforming.

Figure 15:
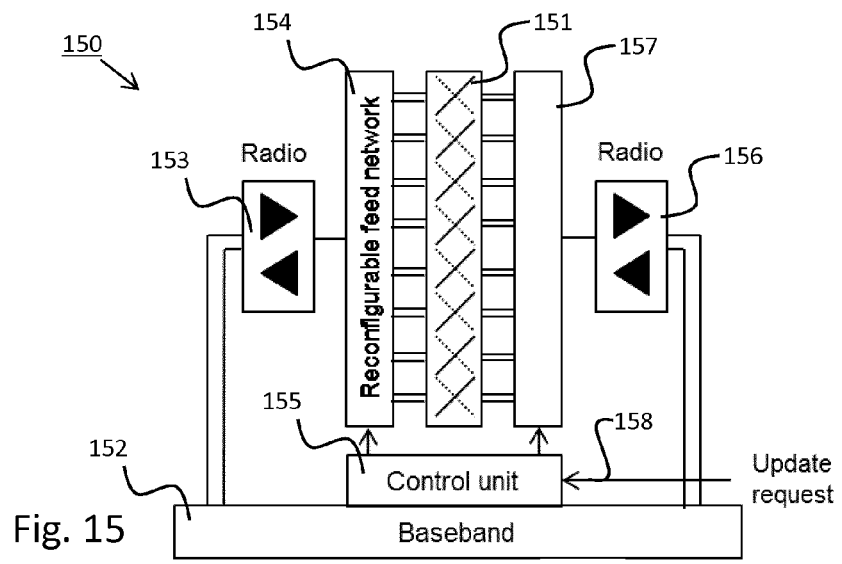
FIG. 15 shows a first embodiment of an antenna system comprising an active one-dimensional antenna array.

FIG. 15 shows a first embodiment of an antenna system 150 comprising an active one-dimensional antenna array 151 having dual polarized antenna subarrays comprising first antenna subarrays, indicated by solid lines, and second antenna subarrays, indicated by dotted lines (as described in connection with FIG. 1a). A base band 152 is configured to be connected to the first and second antenna subarrays of the antenna array 151 via a first radio 153 (with PA/LNA circuitry) and a reconfigurable feed network 154. The base band 152 is in this embodiment also connected to the first and second antenna subarrays of the antenna array via a second radio 156 (with a PA/LNA circuitry) and a reconfigurable feed network 157. A control unit 155 is configured to select port partitioning matrix for each antenna port used by the base band 152 by controlling the reconfigurable feed network 154 and 157 to ensure that the lowest sidelobe level is achieved for a selected beamwidth of the beam generated by the antenna array 151 for each antenna port. Thus, the control unit 155 controls each network to connect an amplifier within the first and second radio to any subarray in the antenna array 151. The control unit 155 may be provided with an input 158 to receive an update request to determine new port properties.

Figure 16:
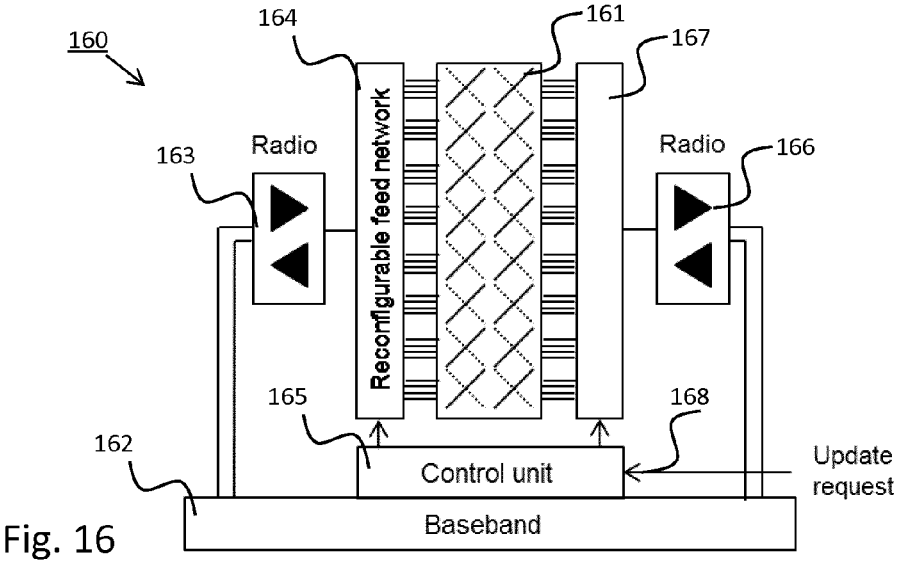
FIG. 16 shows a second embodiment of an antenna system comprising an active two-dimensional antenna array.

FIG. 16 shows a second embodiment of an antenna system 160 comprising an active two-dimensional antenna array 161 having dual polarized antenna subarrays comprising first antenna subarrays, indicated by solid lines, and second antenna subarrays, indicated by dotted lines (as described in connection with FIG. 8a). A baseband 162 is configured to be connected to the first and second antenna subarrays of the antenna array 161 via a first radio transceiver circuitry 163 (comprising PA/LNA) and a reconfigurable feed network 164. The baseband 162 is in this embodiment also connected to the first and second antenna subarrays of the antenna array via a second radio transceiver circuitry 166 (comprising PA/LNA) and a reconfigurable feed network 167. A control unit 165 is configured to select port partitioning matrix for each antenna port used by the base band 162 by controlling the reconfigurable feed network 154 and 157 to ensure that the lowest sidelobe level is achieved for a selected beamwidth of the beam generated by the antenna array 161 for each antenna port. Thus, the control unit 165 controls each network to connect an amplifier within the first and second radio to any subarray in the antenna array 161. The control unit 165 may be provided with an input 168 to receive an update request to determine new port properties.

Figure 17:
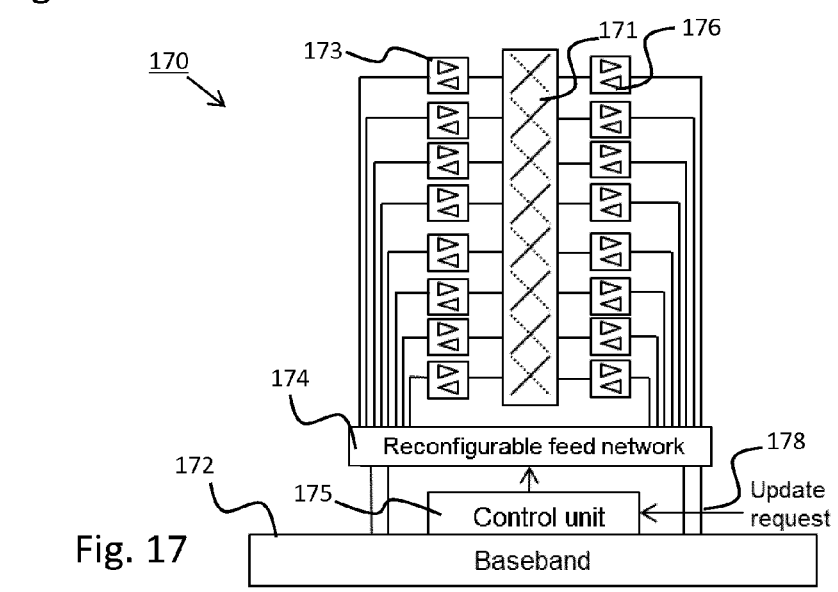
FIG. 17 shows a third embodiment of an antenna system comprising an active one-dimensional antenna array.

FIG. 17 shows a third embodiment of an antenna system 170 comprising an active one-dimensional antenna array 171 having dual polarized antenna subarrays comprising first antenna subarrays, indicated by solid lines, and second antenna subarrays, indicated by dotted lines (as described in connection with FIG. 1*a*). A base band 172 is configured to be connected to each first antenna subarrays of the antenna array 171 via a reconfigurable feed network 174 and a separate amplifier/radio 173 (with PA/LNA circuitry). Furthermore, the base band 172 also configured to be connected to each second antenna subarrays of the antenna array via the same reconfigurable feed network 174 and a separate amplifier/radio 176 (with PA/LNA circuitry). A control unit 175 is configured to select port partitioning matrix for each antenna port used by the base band 172 by controlling the reconfigurable feed network 174 to ensure that the lowest sidelobe level is achieved for a selected beamwidth of the beam generated by the antenna array 171 for each antenna port. Thus, the control unit 175 controls each network to connect each antenna port via an amplifier within the separate radio to any subarray in the antenna array 171. The control unit 175 may be provided with an input 178 to receive an update request to determine new port properties.

FIGS. 15-17 illustrate different options to connect an active antenna to an antenna port used by the digital baseband in the radio domain (time domain for LTE). The amplification arrangement differs, and may be implemented as a radio for all antenna subarrays in the antenna array (FIGS. 15 and 16) or as separate radios for each antenna subarray (FIG. 17). The requirement on ports with orthogonal polarization in combination with good utilization of power resources and unique resources per port puts restriction on possible port mappings. Of course all port mappings in the specification meet this restriction.

As described above, port properties comprise target beamwidth for each separate beam and desired polarization between beams. In addition port properties may include sidelobe levels which is one input to "adjust effective length" of the antenna aperture. Another example is in which dimension (for example azimuth and elevation) it is desired to have the same polarization in case of four ports.

The invention relates to a method for beamforming a beam using an active antenna 10; 80 having predetermined aperture data 41 comprising M×N dual polarized antenna subarrays 11; 81 within an aperture, each dual polarized antenna subarray comprising a first antenna subarray 12; 82 having a first polarization and a second antenna subarray 13; 83 having a second polarization non-parallel with the first polarization, the method comprises:

a) selecting number of antenna ports 42, each antenna port being adapted to generate a separate beam using a combination of the first antenna subarray 12; 82 and/or the second antenna subarray 13; 83, b) selecting port properties 43, comprising target beamwidth ($BW_{target}$) for each separate beam and desired polarization between beams, and c) determining port partitioning based upon aperture data and port properties for each antenna port 44, to adjust an effective length of the aperture over which the beam is created and thereby defining which first antenna subarray(s) 12; 82 and/or second antenna subarray(s) 13; 83 to use for each antenna port.

The method further comprises, when instructions are received to change port properties, repeating steps b) and c) to achieve adaptive beamforming; or when instructions are received to change port properties, repeating steps a), b) and c) to achieve adaptive beamforming.

The effective length of the aperture in step c) may be adjusted by selecting at least one first antenna subarray 12; 82 and at least one second antenna subarray 13; 83 for each antenna port, or selecting only first 12; 82 or second 13; 83 antenna subarrays for each antenna port.

An amplifier/radio may be connected to each first and second antenna subarray, and the method further comprises connecting each first antenna subarray 12; 82 and each second antenna subarray 13; 83 in the active antenna to a single antenna port via said amplifiers based upon the port partitioning determined in step c).

The step of determining the port partitioning may comprise:

c1) determining a first port partitioning matrix, defining which first antenna subarray(s) 12; 82 and second antenna subarray(s) 13; 83 to use for a first antenna port, and c2) generating port partitioning matrix defining which first antenna subarray(s) 12; 82 and second antenna subarray(s) 13; 83 to use for other antenna port(s) based upon said first port partitioning matrix.

For a one-dimensional antenna 10 having 1×N dual polarized antenna subarrays (11) within the aperture, step c1) may comprise:

c1a) determining a reference beamwidth ($BW_{reference}$), obtained by feeding all subarrays in the active antenna with unit amplitude and zero phase, c1b) calculating a value "n" approximately given by dividing the reference beamwidth with the target beamwidth and multiplying with the total number of antenna subarrays N $$n = \frac{BW_{reference}}{BW_{desired}} N,$$

and c1c) determining the port partitioning based on the calculated value "n" and the total number of antenna subarrays N.

Furthermore, step c1c) may comprise:

calculating a beamforming index ($BF_{index}$) indicative of the port partitioning by the following equation:

$$BF_{index} = \frac{N-n}{N},$$

and deciding the port partitioning based upon the calculated beamforming index.

The step of deciding the port partitioning may further comprise:

if beamforming index is in the order less than 0.3 ($BF_{index} \leq 0.3$) then single polarization beamforming is selected using "n" first antenna subarrays, or if beamforming index is ranging from 0.3-0.5 ($0.3 < BF_{index} < 0.5$) then single polarization beamforming using "n" first antenna subarrays or dual polarization beamforming using "n" first antenna subarrays and "N−n" second antenna subarrays is selected, or if beamforming index is in the order of, or larger than, 0.5 ($BF_{index} \geq 0.5$) then dual polarization beamforming using equal number of first antenna subarrays and second antenna subarrays is selected.

The first polarization may be selected to be orthogonal to the second polarization.

Each port partitioning determined in step c) may comprise selecting phase and magnitude for each first 12; 82 and/or second 13; 83 antenna subarray defined to be used for each antenna port, and the magnitude may be selected to be uniform for each first 12; 82 and/or second 13; 83 antenna subarray.

The invention also relates to antenna system 150; 160; 170 configured to transmit at least two beams, the antenna system comprising:
- an active antenna 151; 161; 171 having predetermined aperture data comprising M×N dual polarized antenna subarrays 11; 81 within an aperture, each dual polarized antenna subarray comprising a first antenna subarray 12; 82 having a first polarization and a second antenna subarray 13; 83 having a second polarization, non-parallel with said first polarization,
- an amplification arrangement 153, 156; 163, 166; 173, 176 configured to be connected to each first 12; 82 and second 13; 83 antenna subarray, and
- a control unit 155; 165; 175 adapted to
  a) select number of antenna ports, each antenna port is adapted to generate a separate beam and to be connected to, via said amplification arrangement 153, 156; 163, 166; 173, 176, a combination from said first antenna subarray 12; 82 and/or said second antenna subarray 13; 83,
  b) select port properties, comprising target beamwidth ($BW_{target}$) for each separate beam and desired polarization between beams, and
  c) determine port partitioning based upon aperture data and port properties for each antenna port, to adjust an effective length of the aperture over which the beam is created and thereby define which first antenna subarray(s) 12; 82 and/or second antenna subarray(s) 13; 83 to use for each antenna port.

The control unit 155; 165; 175 further may be adapted to receive instructions to change port properties, and when instructions are received repeat the functions in b) and c) to achieve adaptive beamforming; or when instructions are received repeat the functions in a), b) and c) port to achieve adaptive beamforming.

The control unit 155; 165; 175 may be adapted to adjust the effective length of the aperture by selecting at least one first antenna subarray 12; 82 and at least one second antenna subarray 13; 83 for each antenna port, or selecting only first 12; 82 or second 13; 83 antenna subarrays for each antenna port.

The amplification arrangement may comprise an amplifier/radio 173, 176 connected to each first 12; 82 and second 13; 83 antenna subarray, and said control unit 155; 165; 175 may further be adapted to connect each first antenna subarray 12; 82 and each second antenna subarray 13; 83 in the active antenna 151; 161; 171 to a single antenna port via said amplifiers 173, 176 based upon the determined port partitioning.

The function c) in the control unit 155; 165; 175 may further be adapted to:
- c1) determine a first port partitioning matrix, defining which first antenna subarray(s) and second antenna subarray(s) to use for a first antenna port, and
- c2) generate port partitioning matrix defining which first antenna subarray(s) and second antenna subarray(s) to use for other antenna port(s) based upon said first port partitioning matrix.

Furthermore, when the active antenna is a one-dimensional antenna 151; 171 having 1×N dual polarized antenna subarrays within the aperture, function c1) in the control unit 155; 175 may further be adapted to:
- c1a) determine a reference beamwidth ($BW_{reference}$), obtained by feeding all subarrays in the active antenna with unit amplitude and zero phase,
- c1b) calculate a value "n" approximately given by dividing the reference beamwidth with the target beamwidth and multiplying with the total number of antenna subarrays N $$n = \frac{BW_{reference}}{BW_{desired}} N,$$

and
- c1c) determine the port partitioning based on the calculated value n and the total number of antenna subarrays N The function c1c) in the control unit (155; 175) may further be adapted to:
- calculate a beamforming index ($BF_{index}$) indicative of the port partitioning by the following equation:

$$BF_{index} = \frac{N-n}{N},$$

and
- decide the port partitioning based upon the calculated beamforming index.

In this case the control unit 155; 175 may be adapted to:
- select single polarization beamforming using "n" first antenna subarrays if beamforming index is in the order less than 0.3 ($BF_{index} \leq 0.3$); or
- select single polarization beamforming using "n" first antenna subarrays or dual polarization beamforming using "n" first antenna subarrays and "N–n" second antenna subarrays if beamforming index is ranging from 0.3-0.5 ($0.3 < BF_{index} < 0.5$), or
- select dual polarization beamforming using equal number of first antenna subarrays and second antenna subarrays if beamforming index is in the order of, or larger than, 0.5 ($BF_{index} \geq 0.5$).

The first polarization may be orthogonal to said second polarization.

The control unit may be adapted to select phase and magnitude for each first 12; 82 and/or second antenna subarray 13; 83 defined to be used for each antenna port, and may be adapted to select uniform magnitude for each first and/or second antenna subarray.

Each antenna subarray may comprise one antenna element or a group of antenna elements connected by a feed network.

The control unit may be adapted to connect each antenna subarray to a single antenna port.

ABBREVIATIONS

DPBF—Dual Polarization BeamForming
HPBW—Half-Power BeamWidth
LNA—Low Noise Amplifier
LTO—Long-Term Evolution PA—Power Amplifier
RAS-SON—Reconfigurable Antenna System—Self Organizing Network
SPBF—Single Polarization BeamForming

The invention claimed is:

1. A method for beamforming a beam using an active antenna having predetermined aperture data comprising M×N dual polarized antenna subarrays within an aperture, each dual polarized antenna subarray comprising a first antenna subarray having a first polarization and a second antenna subarray having a second polarization non-parallel with said first polarization, the method comprising:
   a) selecting number of antenna ports, each antenna port being adapted to generate a separate beam using at least one of: said first antenna subarray and said second antenna subarray;
   b) selecting port properties, comprising target beamwidth ($BW_{target}$) for each separate beam and desired polarization between beams; and
   c) determining port partitioning based upon aperture data and port properties for each antenna port, to adjust an effective length of the aperture over which the beam is created and thereby defining which first antenna subarray(s) and/or second antenna subarray(s) to use for each antenna port.

2. The method according to claim 1, further comprising: when instructions are received to change port properties, repeating steps b) and c) to achieve adaptive beamforming.

3. The method according to claim 1, further comprising: when instructions are received to change port properties, repeating steps a), b) and c) to achieve adaptive beamforming.

4. The method according to claim 1, wherein the effective length of the aperture in step c) is adjusted by selecting at least one first antenna subarray and at least one second antenna subarray for each antenna port, or selecting only first or second antenna subarrays for each antenna port.

5. The method according to claim 1, wherein an amplifier is connected to each first and second antenna subarray, and said method further comprises connecting each first antenna subarray and each second antenna subarray in the active antenna to a single antenna port via said amplifiers based upon the port partitioning determined in step c).

6. The method according to claim 1, wherein step c) further comprises:
   c1) determining a first port partitioning matrix, defining which first antenna subarray(s) and second antenna subarray(s) to use for a first antenna port, and
   c2) generating port partitioning matrix defining which first antenna subarray(s) and second antenna subarray(s) to use for other antenna port(s) based upon said first port partitioning matrix.

7. The method according to claim 6, wherein said active antenna is a one-dimensional antenna having 1×N dual polarized antenna subarrays within the aperture, wherein step c1) further comprises:
   c1a) determining a reference beamwidth ($BW_{reference}$), obtained by feeding all subarrays in the active antenna with unit amplitude and zero phase,
   c1b) calculating a value "n" approximately given by dividing the reference beamwidth with the target beamwidth and multiplying with the total number of antenna subarrays N $$n = \frac{BW_{reference}}{BW_{desired}} N,$$

and
   c1c) determining the port partitioning based on the calculated value "n" and total number of antenna subarrays N.

8. The method according to claim 7, wherein step c1c) further comprises:
   calculating a beamforming index ($BF_{index}$) indicative of the port partitioning by the following equation:

$$BF_{index} = \frac{N-n}{N},$$

and
   deciding the port partitioning based upon the calculated beamforming index.

9. The method according to claim 8, wherein step of deciding the port partitioning further comprises:
   if beamforming index is in the order less than 0.3 ($BF_{index} \leq 0.3$) then single polarization beamforming is selected using "n" first antenna subarrays, or
   if beamforming index is ranging from 0.3-0.5 ($0.3 < BF_{index} < 0.5$) then single polarization beamforming using "n" first antenna subarrays or dual polarization beamforming using "n" first antenna subarrays and "N−n" second antenna subarrays is selected, or
   if beamforming index is in the order of, or larger than, 0.5 ($BF_{index} \geq 0.5$) then dual polarization beamforming using equal number of first antenna subarrays and second antenna subarrays is selected.

10. The method according to claim 1, wherein said first polarization is selected to be orthogonal to said second polarization.

11. The method according to claim 1, wherein each port partitioning determined in step c) comprises selecting phase and magnitude for each first and/or second antenna subarray defined to be used for each antenna port.

12. The method according to claim 11, wherein said magnitude is selected to be uniform for each first and/or second antenna subarray.

13. An antenna system configured to transmit at least two beams, the antenna system comprising:
   an active antenna having predetermined aperture data comprising M×N dual polarized antenna subarrays within an aperture, each dual polarized antenna subarray comprising a first antenna subarray having a first polarization and a second antenna subarray having a second polarization, non-parallel with said first polarization,
   an amplification arrangement configured to be connected to each first and second antenna subarray, and
   a control unit adapted to
   a) select number of antenna ports, each antenna port is adapted to generate a separate beam and to be connected to, via said amplification arrangement, a combination from said first antenna subarray and/or said second antenna subarray,
   b) select port properties, comprising target beamwidth ($BW_{target}$) for each separate beam and desired polarization between beams, and
   c) determine port partitioning based upon aperture data and port properties for each antenna port, to adjust an effective length of the aperture over which the beam is created and thereby define which first antenna subarray (s) and/or second antenna subarray(s) to use for each antenna port.

14. The antenna system according to claim 13, wherein said control unit further is adapted to receive instructions to change port properties, and when instructions are received repeat the functions in b) and c) to achieve adaptive beamforming.

15. The antenna system according to claim 13, wherein said control unit further is adapted to receive instructions to change port properties, and when instructions are received repeat the functions in a), b) and c) port to achieve adaptive beamforming.

16. The antenna system according to claim 13, wherein the control unit is adapted to adjust the effective length of the aperture in by selecting at least one first antenna subarray and at least one second antenna subarray for each antenna port, or selecting only first or second antenna subarrays for each antenna port.

17. The antenna system according to claim 13, wherein said amplification arrangement comprises an amplifier connected to each first and second antenna subarray, and said control unit further is adapted to connect each first antenna subarray and each second antenna subarray in the active antenna to a single antenna port via said amplifiers based upon the determined port partitioning.

18. The antenna system according to claim 13, wherein function c) in the control unit further is adapted to:

c1) determine a first port partitioning matrix, defining which first antenna subarray(s) and second antenna subarray(s) to use for a first antenna port, and c2) generate port partitioning matrix defining which first antenna subarray(s) and second antenna subarray(s) to use for other antenna port(s) based upon said first port partitioning matrix.

19. The antenna system according to claim 18, wherein said active antenna is a one-dimensional antenna having 1×N dual polarized antenna subarrays within the aperture, wherein function c1) in the control unit further is adapted to:

c1a) determine a reference beamwidth ($BW_{refernace}$), obtained by feeding all subarrays the active antenna with unit amplitude and zero phase, c1b) calculate a value "n" approximately given by dividing the reference beamwidth with the target beamwidth and multiplying with the total number of antenna subarrays N $$n = \frac{BW_{reference}}{BW_{desired}} N,$$

and c1c) determine the port partitioning based on the calculated value n and the total number of antenna subarrays N.

20. The antenna system according to claim 19, wherein function c1c) in the control unit further is adapted to:

calculate a beamforming index ($BF_{index}$) indicative of the port partitioning by the following equation:

$$BF_{index} = \frac{N-n}{N},$$

and decide the port partitioning based upon the calculated beamforming index.

21. The antenna system according to claim 20, wherein the control unit is adapted to:

select single polarization beamforming using "n" first antenna subarrays if beamforming index is in the order less than 0.3 ($BF_{index} \leq 0.3$); or select single polarization beamforming using "n" first antenna subarrays or dual polarization beamforming using "n" first antenna subarrays and "N−n" second antenna subarrays if beamforming index is ranging from 0.3-0.5 ($0.3 < BF_{index} < 0.5$), or select dual polarization beamforming using equal number of first antenna subarrays and second antenna subarrays if beamforming index is in the order of, or larger than, 0.5 ($BF_{index} \geq 0.5$).

22. The antenna system according to claim 13, wherein said first polarization is orthogonal to said second polarization.

23. The antenna system according to claim 13, wherein the control unit is adapted to select phase and magnitude for each first and/or second antenna subarray defined to be used for each antenna port.

24. The antenna system according to claim 23, wherein the control unit is adapted to select uniform magnitude for each first and/or second antenna subarray.

25. The antenna system according to claim 13, wherein each antenna subarray comprising one antenna element or a group of antenna elements connected by a feed network.

26. The antenna system according to claim 13, wherein the control unit is adapted to connect each antenna subarray to a single antenna port.

* * * * *